US009594830B2

(12) United States Patent
Andrews et al.

(10) Patent No.: US 9,594,830 B2
(45) **Date of Patent: *Mar. 14, 2017**

(54) IDENTIFYING POSSIBLE CONTEXTS FOR A SOURCE OF UNSTRUCTURED DATA

(71) Applicant: International Business Machines Corporation, Armonk, NY (US)

(72) Inventors: Gregory P. Andrews, Rochester, MN (US); Adam T. Clark, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/549,649

(22) Filed: Nov. 21, 2014

(65) Prior Publication Data

US 2016/0110338 A1 Apr. 21, 2016

Related U.S. Application Data

(63) Continuation of application No. 14/516,658, filed on Oct. 17, 2014.

(51) Int. Cl.

*G06F 17/30* (2006.01)
*G06F 7/24* (2006.01)
*G06F 17/27* (2006.01)

(52) U.S. Cl.

CPC .......... *G06F 17/30675* (2013.01); *G06F 7/24* (2013.01); *G06F 17/2785* (2013.01); *G06F 17/30539* (2013.01); *G06F 17/30654* (2013.01); *G06F 17/30696* (2013.01); *G06F 17/30699* (2013.01)

(58) Field of Classification Search

CPC ..................................................... G06F 17/278
USPC ......................................................... 707/705
See application file for complete search history.

(56) References Cited

U.S. PATENT DOCUMENTS 7,225,199 B1 5/2007 Green et al.
8,594,996 B2 11/2013 Liang et al.
8,700,604 B2 4/2014 Roseman et al.
2004/0236725 A1* 11/2004 Amitay ............. G06F 17/30672
2007/0094246 A1* 4/2007 Dill ................... G06F 17/30616
2007/0260598 A1* 11/2007 Odom ............... G06F 17/30648
2009/0259995 A1 10/2009 Inmon
2012/0084076 A1* 4/2012 Boguraev ........... G06F 17/2735 704/9
2013/0226928 A1* 8/2013 Bier .................. G06F 17/30241 707/741

(Continued)

OTHER PUBLICATIONS

Article entitled "Combining Global Relevance Information with Local Contextual Clues for Event-Oriented Information Extraction", by Patwardhan, dated Jul. 2008.*

(Continued)

*Primary Examiner* — Mahesh Dwivedi
(74) *Attorney, Agent, or Firm* — Daniel C. Housley

(57) ABSTRACT

Potential clues are identified from an unstructured data source. The potential clues are each associated with one or more contexts. A first set of potential contexts for the unstructured data source are determined based on the potential clues. A confidence value for each potential context in the set of the potential contexts is calculated based on the potential clues. A second set of potential contexts is returned from the first set of potential contexts.

6 Claims, 5 Drawing Sheets

(56) References Cited

U.S. PATENT DOCUMENTS

| | | | | |
|---|---|---|---|---|
| 2014/0067363 | A1 | 3/2014 | Ogren et al. | |
| 2014/0136184 | A1* | 5/2014 | Hatsek | G06F 17/278 704/9 |
| 2014/0365515 | A1* | 12/2014 | Garrett | G06F 17/30672 707/759 |
| 2015/0106078 | A1* | 4/2015 | Chang | G06F 17/30705 704/9 |
| 2015/0135053 | A1* | 5/2015 | Doornenbal | G06F 17/277 715/230 |

OTHER PUBLICATIONS

Article entitled "A confidence-based framework for disambiguating geographic terms", by Rauch et al., dated 2003.*

Patwardhan, S., "Combining Global Relevance Information with Local Contextual Clues for Event-Oriented Information Extraction," School of Computing, University of Utah, Salt Lake City, UT, Copyright 2008, Association for the Advancement of Artificial Intelligence (www.aaai.org).

Andrews et al., "Identifying Possible Contexts for a Source of Unstructured Data," U.S. Appl. No. 14/516,658, filed Oct. 17, 2014.

IBM, "List of IBM Patents or Patent Applications Treated as Related.".

* cited by examiner

IDENTIFYING POSSIBLE CONTEXTS FOR A SOURCE OF UNSTRUCTURED DATA

BACKGROUND

The present disclosure relates to parsing and semantic analysis of unstructured data, and more specifically, to identifying possible contexts for a source of unstructured data.

Extracting attributes from an unstructured data source can provide useful data for making decisions or solving problems. Natural language processing techniques can be used to parse and annotate data within unstructured data sources. Question answering systems can use the information extracted from unstructured data sources in responding to queries and more information can lead to more accurate answers.

SUMMARY

According to embodiments of the present disclosure, a method for identifying potential contexts for an unstructured data source is disclosed. The method includes identifying potential clues from the unstructured data source. The potential clues are each associated with one or more contexts. The method further includes determining a first set of potential contexts for the unstructured data source based on the potential clues. The method further includes calculating an associated confidence value for each potential context in the first set of the potential contexts based on the potential clues. The method further includes returning a second set of potential contexts from the first set of potential contexts.

Further disclosed herein are embodiments of a computer program product for identifying potential contexts for an unstructured data source. The computer program product includes a computer readable storage medium having program instructions embodied therewith. The program instructions are executable by a computer to cause the computer to perform a method. The method includes identifying potential clues from the unstructured data source. The potential clues are each associated with one or more contexts. The method further includes determining a first set of potential contexts for the unstructured data source based on the potential clues. The method further includes calculating an associated confidence value for each potential context in the first set of the potential contexts based on the potential clues. The method further includes returning a second set of potential contexts from the first set of potential contexts.

Further disclosed herein are embodiments of a system for identifying potential contexts for an unstructured data source. The system includes one or more processors, one or more computer-readable memories, one or more computer-readable tangible storage devices, and program instructions stored on at least one of the one or more storage devices for execution by at least one of the one or more processors via at least one of the one or more memories. The program instructions are configured to cause the system to perform a method. The method includes identifying potential clues from the unstructured data source. The potential clues are each associated with one or more contexts. The method further includes determining a first set of potential contexts for the unstructured data source based on the potential clues. The method further includes calculating an associated confidence value for each potential context in the first set of the potential contexts based on the potential clues. The method further includes returning a second set of potential contexts from the first set of potential contexts.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
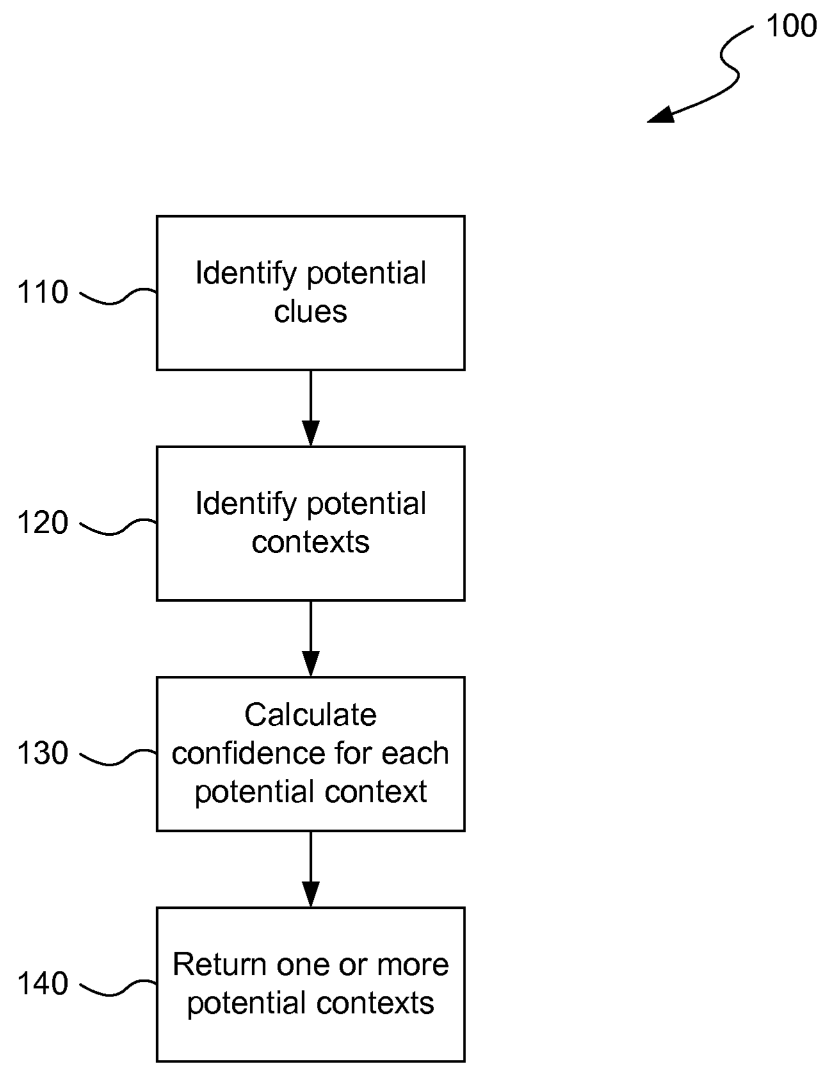
FIG. 1 depicts a flow diagram of an example method for identifying possible contexts of an unstructured data source.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to identifying possible contexts for unstructured data, and more particular aspects relate to resolving ambiguous concepts with an identified context. While the present disclosure is not necessarily limited to such applications, various aspects of the disclosure may be appreciated through a discussion of various examples using this context.

When parsing an unstructured data source, such as a document, certain concepts may be found which are identifiable, but ambiguous without further analysis and context. A concept may be a string of text or numbers in unstructured data that represents an idea. A concept can be represented by multiple words, and a concept can represent any part of speech. Ambiguous concepts may include dates, times and other formatted numbers, and names of people or places. For example, the string “Dec. 1, 2014” may be identified as a date, but the meaning could be different based on the format used. It may mean the first day of December in 2014 or the twelfth day of January in 2014. Similarly, the text “Washington” may refer to the state, the capital of the U.S., or the name of the former U.S. President, among other things.

Clues within the unstructured data source may help to identify possible contexts. The clues may include strings or text which are associated with particular contexts. Some clues may be completely unambiguous evidence of a particular context. Some clues may be associated with several contexts; however, these clues may still be useful if they are not associated with all possible contexts. The contexts may help resolve the ambiguity of the concept. Contexts may include the locale of the unstructured data source, a general topic of the unstructured data source, or any other linking element for the unstructured data source which may resolve an ambiguous concept.

As mentioned previously, identifying a locale for the unstructured document may help resolve an ambiguous concept. Clues for identifying the locale may include dates, numerical values, character set, currency values, geographical references, spelling, text language, colloquialisms, or other locale-inducing concepts. For example, dates may be found such as 31 Jan. 2014 which may not be ambiguous as the only reasonable interpretation may be day/month/year. Locations, such as countries or regions, which use the date format month/day/year may be the locale of the unstructured data source. The use of commas or decimal points in numerical values may be associated with particular locations (e.g. “1,000,000” vs “1.000.000”). Further, the character set used may be associated with one or more locations. Currency values may be identified which use a symbol associated with specific countries (e.g. $, €, or £). The spelling of certain words may be associated with certain locations (e.g. “color” vs. “colour”). Certain colloquialisms may be found which are associated with particular locations.

Additionally, as mentioned above, identifying a general topic of the unstructured data may resolve the ambiguity. Using the “Washington” example above, clues may include other state names, the name “George” or references to other presidents, or places and things associated with Washington D.C.

The clues, and possibly the ambiguous concepts, may be used to identify potential contexts. Contexts associated with each clue or ambiguous concept may be identified as potential contexts. For example, in embodiments where the contexts are locales, each location associated with a concept in the unstructured data may be identified as a potential locale.

Confidence values may be calculated for each of the identified potential contexts. There are several known methods for calculating confidence values which could be used. In an example embodiment, the confidence value for each potential context is initialized to 0. Each ambiguous concept and each clue is applied to each potential context. If the ambiguous concept or clue is valid for a potential context, the confidence value for the potential context is increased. As a result, the potential context with the highest confidence value after applying the ambiguous concepts and clues may be the most likely context for the unstructured data source.

The potential contexts and associated confidence values may be used in multiple ways. As mentioned previously, ambiguous concepts may be resolved using the context with the highest confidence value. In some embodiments, one or more of the potential contexts and associated confidence values may be input into subsequent data mining techniques used against the unstructured data source.

For example, two locales may have been identified with confidence scores significantly greater than the rest of the potential locales but were unable to find a single clear locale. Although there are differences between the two locales, both use the same date format. Thus, subsequent data mining to retrieve dates from the unstructured data source may use the information on possible locales to identify ambiguous dates while other ambiguous concepts may remain which are not extracted.

In some embodiments, only the potential context with the highest confidence value is returned and input into subsequent data mining techniques used against the unstructured data source. Subsequent data mining techniques may use the potential context to identify a most likely concept while still retaining the uncertainty indicated by the confidence value.

Alternatively, the context with the highest confidence value may be used to spell-check, grammar-check, or format-check the document. The concepts, including ambiguous and unambiguous concepts, which do not match the spelling, grammar, or format associated with the context may be modified. For example, if the locale of a document is determined to be the United States, a date in the format 30 Feb. 2014 may be changed to Feb. 30, 2014. This may allow a document to be normalized to a single context to prevent confusion amongst readers or data processing algorithms.

Referring to FIG. 1, a flow diagram of an example method 100 for identifying possible contexts of an unstructured data source is depicted. At block 110, potential clues are identified in the unstructured data source. The potential clues may include data in the unstructured data source which is associated with one or more particular contexts as described above. The clues may have been associated with one or more particular contexts using one or more natural language processing techniques. At block 120, potential contexts are identified. The potential contexts may include the contexts associated with the potential clues. At block 130, confidence values are calculated for each of the potential contexts. There are many known methods for calculating confidence values. In some embodiments, the confidence value for each potential context is initialized to 0 and is increased for each clue which is valid for the potential context. At block 140, one or more of the potential contexts are returned. This could include any number of the potential contexts and may or may not include the associated confidence scores. The returned contexts and confidence scores may be input into subsequent data mining techniques. In some embodiments, only the potential context with the highest confidence score is returned. The potential context with the highest confidence score may be used to spell/grammar/format-check the unstructured data source.

Figure 2:
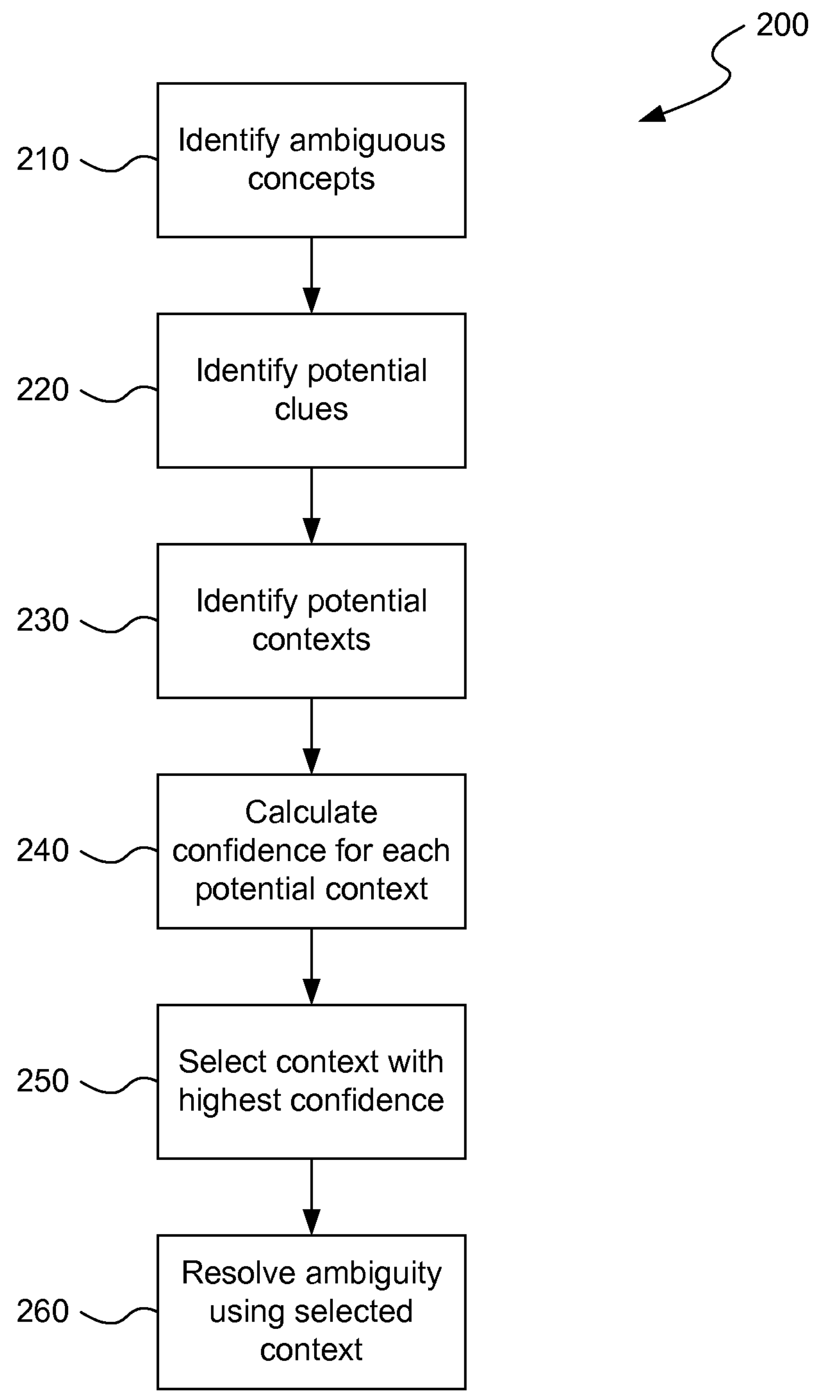
FIG. 2 depicts a flow diagram of an example method for resolving an ambiguous concept in an unstructured data source.

Referring to FIG. 2, a flow diagram of an example method 200 for resolving an ambiguous concept in an unstructured data source is depicted. At block 210, one or more ambiguous concepts are identified within a set of unstructured data. This may include identifying concepts which have been annotated with multiple possible meanings. These annotations may have been assigned by one or more concept annotators. There are several types of concept annotators which may be used such as ontology mapping annotators, rule-based term annotators, and dictionary-based text annotators. In some embodiments, only concepts of certain types may be used for identifying ambiguous concepts. At block 220, clues are identified in the unstructured data source. At block 230, potential contexts are identified. At block 240, confidence values are calculated for each of the potential contexts. At block 250, the potential context with the highest confidence value is selected. At block 260, the one or more ambiguous concepts are resolved using the selected potential context. This may include modifying annotations associated with the ambiguous concepts to remove the interpretations which are inconsistent with the potential context.

Figure 3:
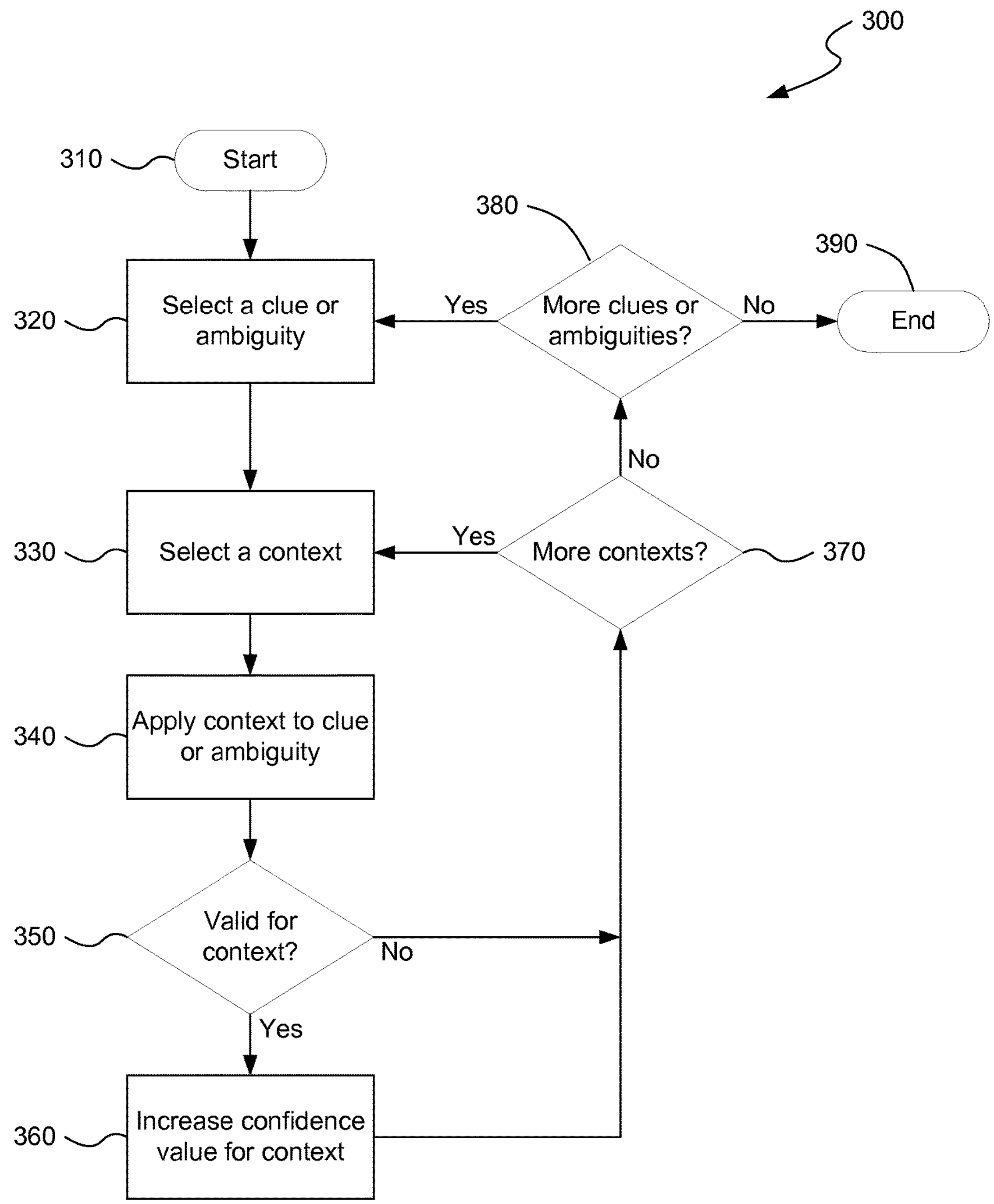
FIG. 3 depicts a flow diagram of an example method for calculating confidence values for potential contexts.

Referring to FIG. 3, a flow diagram of an example method 300 for calculating confidence values for potential contexts is depicted. Method 300 starts at block 310. At block 320, a clue or ambiguity which has been identified is selected. At block 330, a context is selected from the identified potential contexts. At block 340, the selected context is applied to the clue or ambiguity to see if the context is valid for the clue or ambiguity. For example, a locale may use the date format day/month/year. A date of 20 Jan. 2014 is valid for the locale, but a date of Jan. 20, 2014 is not.

At block 350, it is determined whether the clue or ambiguity is valid for the selected context. If the clue or ambiguity is valid, method 300 proceeds to block 360 and increases the confidence value for the selected context before proceeding to block 370. If the clue or ambiguity is not valid for the potential context, method 300 proceeds directly to block 370.

At block 370, it is determined whether there are more potential contexts to apply to the clue or ambiguity. If there are more contexts, method 300 proceeds to block 330 and selects another context. If there are no more contexts, method 300 proceeds to block 380.

At block 380, it is determined if there are more clues or ambiguities. If there are more clues or ambiguities, method 300 proceeds to block 320 and selects another clue or ambiguity. If there are no more clues or ambiguities, method 300 proceeds to block 390 and ends.

Figure 4:
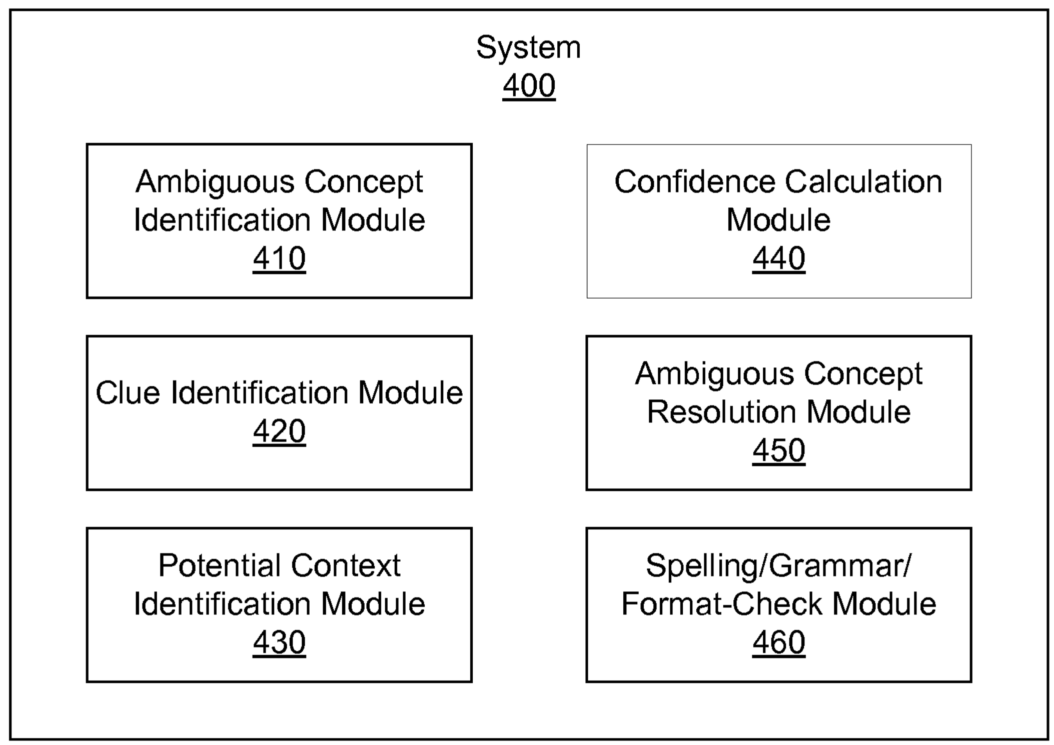
FIG. 4 depicts an example system for identifying possible contexts from unstructured data with an ambiguous concept.

Referring to FIG. 4, an example system 400 for identifying possible contexts from unstructured data with an ambiguous concept is depicted. System 400 includes ambiguous concept identification module 410, clue identification module 420, context module 430, confidence calculation module 440, ambiguous concept resolution module 450, and spelling/grammar/format-check module 460. Ambiguous concept identification module 410 may be configured to identify ambiguous concepts within a set of unstructured data. Clue identification module 420 is configured to identify clues for possible contexts within the set of unstructured data. Context module 430 is configured to identify possible contexts for the set of unstructured data. Confidence calculation module 440 is configured to calculate a confidence value for each possible context based on the identified clues. Ambiguous concept resolution module 450 is configured to resolve ambiguous concepts to be consistent with the context having the highest confidence value. Spelling/grammar/format-check module 460 is configured to check the unstructured data source for spelling, grammar, or formatting which is inconsistent with the context having the highest confidence value. The inconsistent aspects may be changed to be consistent with the context.

Figure 5:
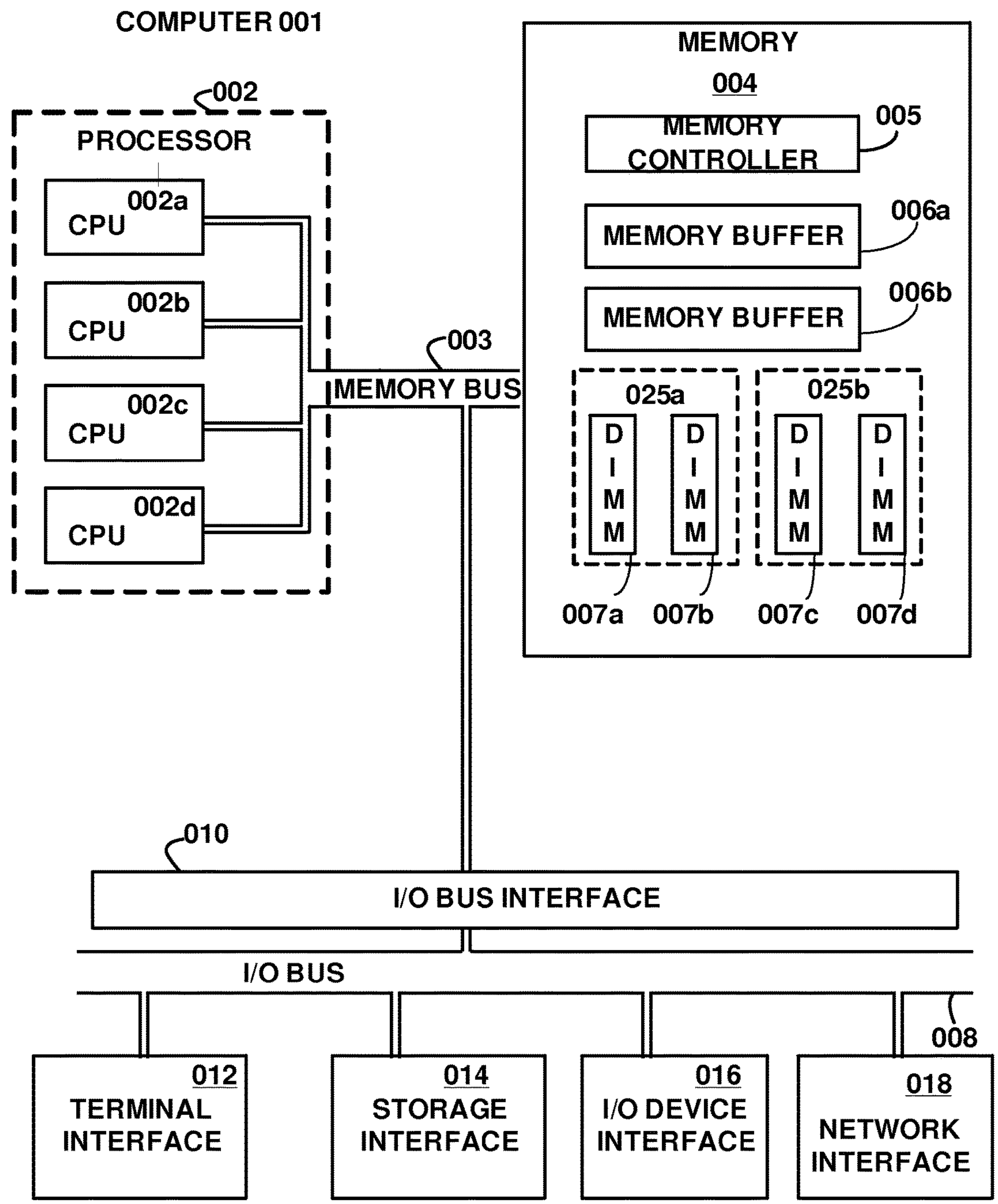
FIG. 5 depicts a high-level block diagram of an example system for implementing one or more embodiments of the invention.

Referring to FIG. 5, a high-level block diagram of an example system for implementing one or more embodiments of the invention is depicted. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffer 006 and one or more memory devices 007. In the illustrated embodiment, the memory devices 007 may be dual in-line memory modules (DIMMs), which are a series of dynamic random-access memory (DRAM) chips mounted on a printed circuit board and designed for use in personal computers, workstations, and servers. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 5 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 5 is intended to depict the representative major components of an exemplary computer system 001. But individual components may have greater complexity than represented in FIG. 5, components other than or in addition to those shown in FIG. 5 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even the DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for identifying potential contexts for an unstructured data source, the method comprising:

identifying potential clues from the unstructured data source, the potential clues each associated with one or more contexts;

determining a first set of potential contexts for the unstructured data source based on the potential clues;

calculating an associated confidence value for each potential context in the first set of the potential contexts based on the potential clues;

returning a second set of potential contexts from the first set of potential contexts, the second set of potential contexts comprising at least a first context with a highest confidence value;

identifying a first concept which is not consistent with the first context; and modifying the first concept to be consistent with the first context, wherein modifying the first concept comprises at least one alteration of the first concept from the group consisting of spelling, grammar, and format.

2. The method of claim 1, further comprising:

inputting the second set of potential contexts into a data mining technique.

3. The method of claim 2, further comprising:

inputting the associated confidence value for each potential context in the second set of potential contexts into the data mining technique.

4. The method of claim 1, further comprising:

identifying an ambiguous concept within the unstructured data source; and resolving the ambiguous concept using the second set of potential contexts, wherein the second set of potential contexts comprises at least a first potential context associated with a highest confidence value.

5. The method of claim 4, wherein the ambiguous concept is a formatted number.

6. The method of claim 1, wherein the first set of potential contexts are locales.

* * * * *